(No Model.) 4 Sheets—Sheet 1.
W. C. CARRICK.
MOTOR FOR TRAM CARS.

No. 356,570. Patented Jan. 25, 1887.

(No Model.) 4 Sheets—Sheet 3.

W. C. CARRICK.
MOTOR FOR TRAM CARS.

No. 356,570. Patented Jan. 25, 1887.

WITNESSES:
John Nolan
John W. Orr

INVENTOR
William C. Carrick
per Joshua Pusey
atty (No Model.)  
4 Sheets—Sheet 4.
W. C. CARRICK.
MOTOR FOR TRAM CARS.
No. 356,570. Patented Jan. 25, 1887.
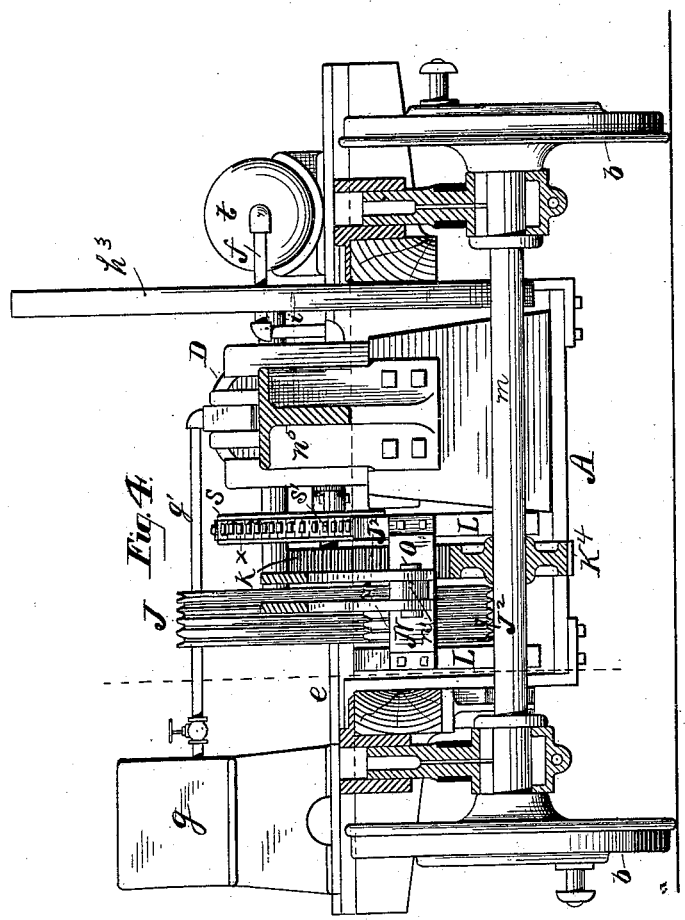
WITNESSES:
John Nolan
John W. Orr
INVENTOR
William C. Carrick,
per Joshua Pusey
atty

UNITED STATES PATENT OFFICE.

WILLIAM C. CARRICK, OF PHILADELPHIA, PENNSYLVANIA.

MOTOR FOR TRAM-CARS.

SPECIFICATION forming part of Letters Patent No. 356,570, dated January 25, 1887.

Application filed July 17, 1885. Serial No. 171,848. (No model.)

*To all whom it may concern:*

Be it known that I, WILLIAM C. CARRICK, a citizen of the United States, residing at the city and county of Philadelphia, and State of Pennsylvania, have invented certain new and useful Improvements in Motors for Tramway-Cars, of which the following is a full, clear, and exact description, reference being had to the accompanying drawings, of which—

Figure 1:
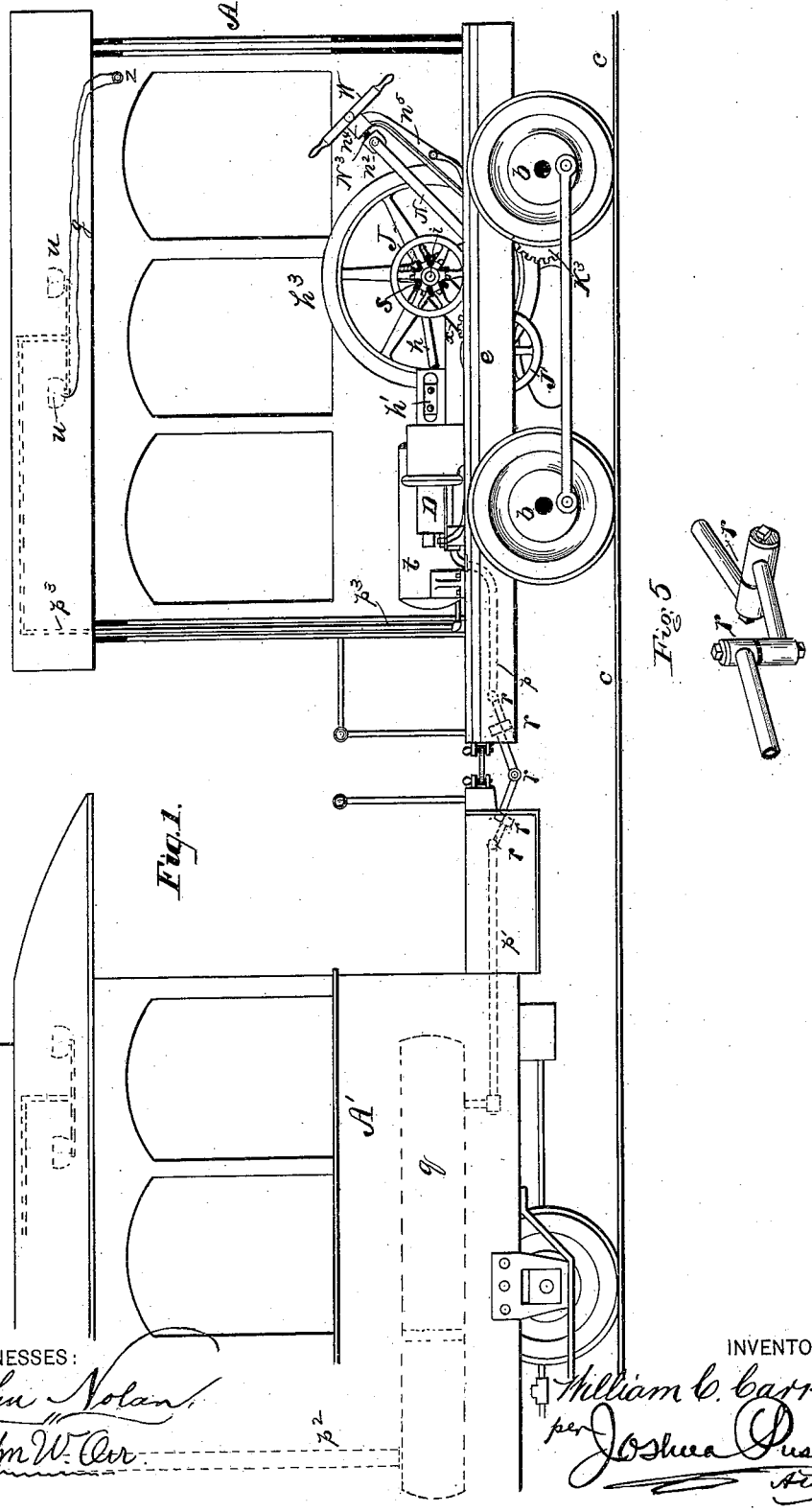
Figure 2:
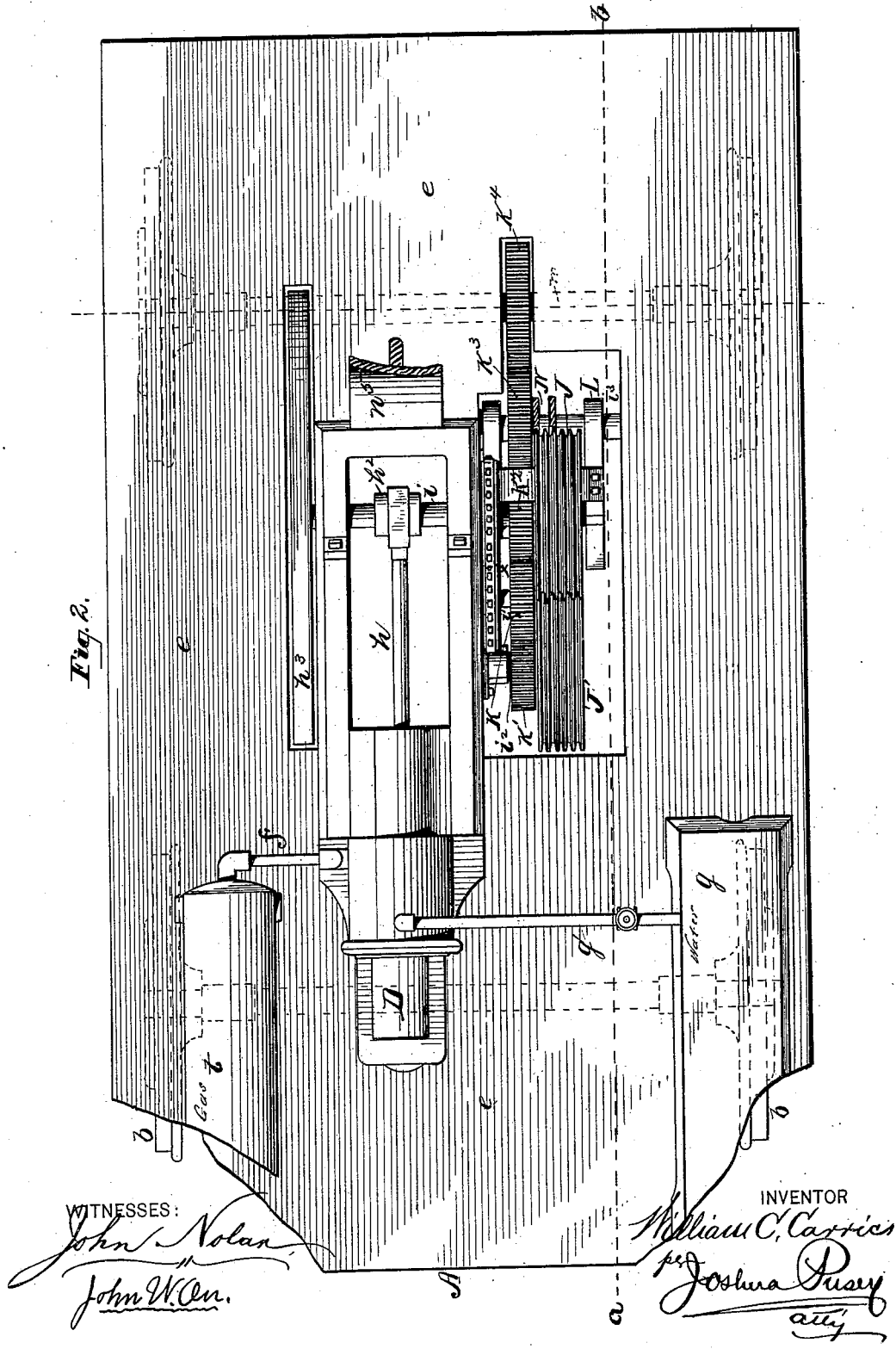
Figure 3:
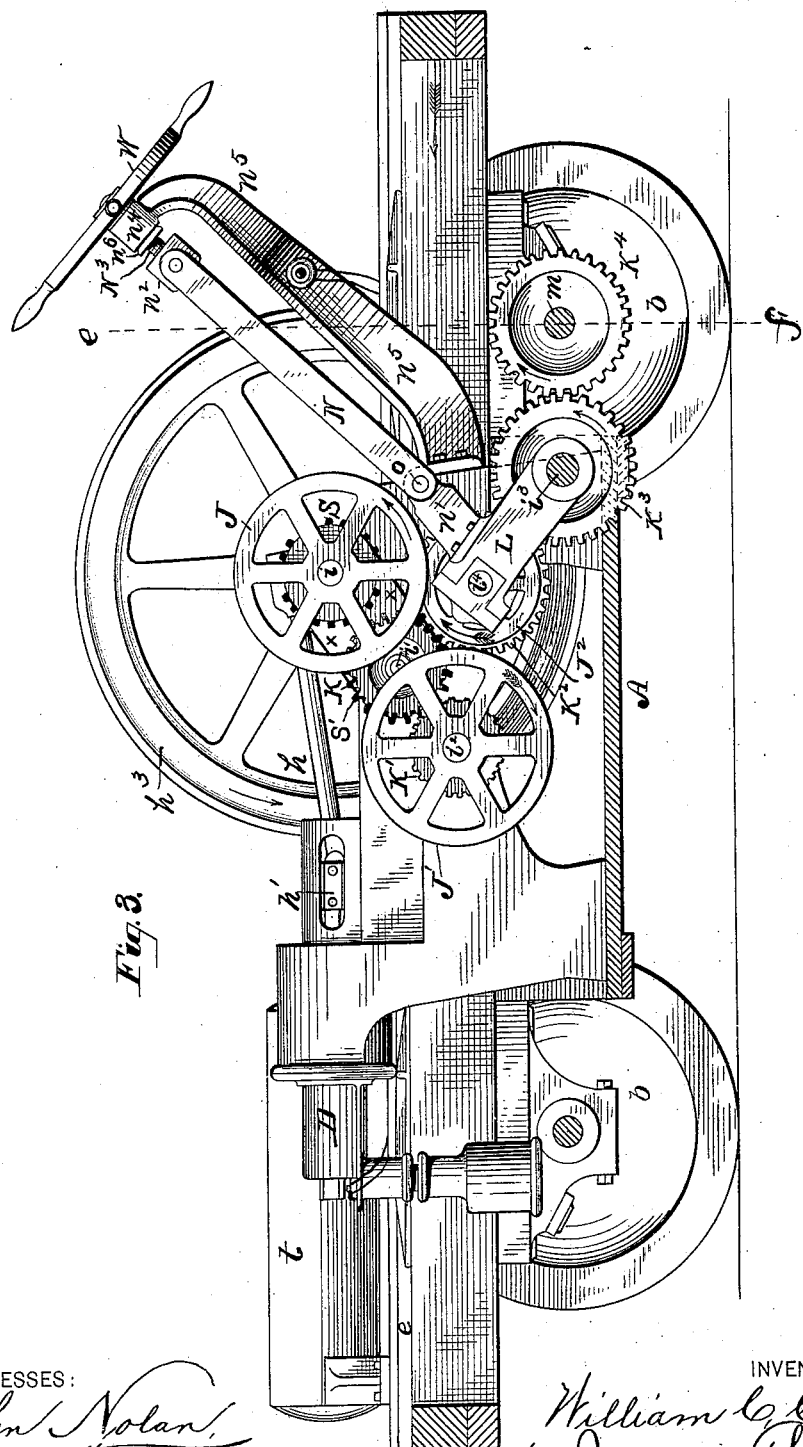

Figure 1, Sheet 1, is a section, as on line $a$ $b$, Fig. 2, of a dummy with attached car having my invention applied thereto. Fig. 2, Sheet 2, is a plan of the dummy-truck, gas-engine, and system of friction-drum and cog-gearing and connections mounted thereon. Fig. 3, Sheet 3, is a section taken as on line $a$ $b$, Fig. 2, showing also the hand-wheel, screw, and connecting-bar for actuating the movable friction-gear $J^2$, for changing the direction of motion, said hand-wheel, screw, and bar being cut off in Fig. 2. Fig. 4, Sheet 4, is a section taken on line $e\ f$, Fig. 3, looking toward the rear. Fig. 5, Sheet 1, is a detail of universal pipe-joint connection between the dummy and car.

Like letters of reference indicate corresponding parts in the several figures.

The general nature of this invention is that of an apparatus for driving cars by means of a gas engine or motor; and it consists, in the first place, of the combination, with a car or dummy upon wheels, of a gas-engine of any known or desired form or style with a system of gearing intermediate the engine and the axle of the car for driving the latter.

It consists, further, in devices, hereinafter particularly set forth, for arresting and changing the direction of the motion of the car without the necessity of stopping or reversing the engine, which latter is not practicable to do with any gas-engines with which I am acquainted.

The invention consists, finally, in details of construction, which will be fully explained hereinafter, and pointed out in certain of the claims.

Referring now to the annexed drawings, A is an ordinary dummy-car running upon wheels $b$, resting upon tram-rails $c$, Fig. 1.

D is a gas-engine, suitably mounted upon the platform $e$. The gas, natural or artificial, is confined under great compression in a tank, $t$, which connects by pipe $f$, Figs. 2 and 4, with the engine.

$g$, Figs. 2 and 4, is the usual reservoir, from which the water is supplied for jacketing the cylinder of the engine, $g'$ being the connecting-pipe. These parts and the essential construction and operation of gas-engines being well understood require no special description.

The rod $h$ connects the piston-rod head $h'$ and the crank $h^2$ on the shaft $i$ of the fly-wheel $h^3$, which shaft is mounted in suitable bearings. Said shaft carries a sprocket-wheel, S, and also a friction wheel or drum, J, preferably grooved, as shown. Another adjacent shaft, $i'$, carries a sprocket-wheel, S', corresponding to S, and also a gear, K, whose teeth always engage with those of a gear, K', upon a shaft, $i^2$, which shaft also carries a friction-drum, J', whose periphery comes opposite to and corresponding, but not in contact with, the first-mentioned drum, J. The two sprocket-wheels are connected by an endless drive-chain, $x$. Figs. 1 and 3. It will be obvious that from the described connection the said friction-drums will rotate in opposite directions when the engine is in operation.

Journaled in a suitable box at the end of an arm, L, which is pivoted on a shaft, $i^3$, is a shaft, $i^4$, that carries a friction-drum, J$^2$, whose face is in line with those of the drums J and J'. Said shaft $i^4$ carries also a gear, K$^2$, whose cogs or teeth engage with those of a gear, K$^3$, upon shaft $i^3$, and the teeth of the latter gear engage with those of a final gear, K$^4$, upon one of the axles $m$ of the dummy.

The object of mounting the friction-wheel J$^2$ and gear K$^2$ upon a swinging arm, as shown, is to provide a convenient means for stopping the car or reversing the direction of its motion while the engine is running. This is accomplished by rotating the arm L on its pivotal shaft, so as to shift the said friction-drum J$^2$ out of contact or engagement with one (as J) of the other two friction-drums, above mentioned, and into engagement with the other, (as J',) and firmly retaining the same in either position.

It is to be borne in mind that the drums J J' rotate in opposite directions, and that the gears K$^2$ and K$^3$ are always engaged, whereby when the periphery of drum J² is forced against that of J, as shown in the drawings, the cars will move in the direction of the arrows, Fig. 3—that is, backward—and when shifted so as to bear against the face of drum J' the direction will be reversed or forward. When, however, the said drum J² is out of contact with the others, the connection is broken, and the motion from the engine is obviously not conveyed to the axle of the car. The arrows in Fig. 3 indicate the direction of rotation of the several gears.

In order to readily rotate the arm L, and thus shift the friction-drum J², for the purpose just described, and to securely retain the same in the several positions, I provide a hand-wheel and screw device. This in the present instance is constructed and arranged as follows: N is a strong connecting-rod, which is pivoted at $o$ to an arm, $n'$, that is fastened to and near the outer end of the pivoted drum and gear bearing-arm L. The upper end of said connecting-rod N has—or there is connected to it—a block, $n^2$, adapted to receive a screw, $N^3$. This screw passes through the head $n^4$ of a heavy bent supporting arm, $n^5$, that is firmly secured to the platform, or a cross-beam thereof, of the car or dummy, and is provided with a hand-wheel, W, for rotating it (the said screw) in either direction. A collar, $n^6$, upon the latter takes the back or upward strain.

Now, it will be readily understood that by turning the hand-wheel in one direction the screw will powerfully draw up the friction-drum J² through the intermediate connections just described, and by sufficiently turning the wheel in the opposite direction the said drum will be depressed to the extent desired.

The engineer stands upon the platform $e$ in proximity to the hand-wheel W, whereby he can at any moment stop or reverse the direction of motion of the car.

The car A' may be heated by the exhaust or waste products of combustion from the engine, which pass through a universal-joint connection, $r\,r$, or to a pipe, $p'$, leading to a cylinder, $q$, located beneath the seat of the car, and after giving off the larger portion of their heat escape through a vertical pipe, $p^2$, into the open air. These heating devices are not claimed herein, but will form the subject of an application for Letters Patent to be filed by me.

The same tank, $t$, filled with the compressed gas, may also supply the burners $u$ of the dummy or cars, the gas being conveyed to said burners by means of a pipe, $p^3$, tapping the aforesaid tank $t$.

$y\,y$ are simply conductor-wires leading from a button, $z$, for lighting the gas by electricity in the usual well-known manner.

I do not wish it to be understood that I limit myself to the precise construction and arrangement of the several parts or mechanism, as hereinbefore described, and as shown in the drawings.

Having thus described my invention in such clear and full terms that one skilled in the art to which the same appertains can understand and practice the same, I claim as new and desire to secure by Letters Patent—

1. In a motor for tram-cars, the combination, with the gas-engine mounted on a suitable truck or dummy, of two friction-drums, both journaled in fixed bearings, driven in opposite directions by the engine by means of suitable gears, and a third friction-drum, with means, substantially as shown, for shifting said last-mentioned drum out of contact with both of said first two drums and into contact with either of the same, together with gearing, substantially as shown, for transmitting the motion imparted to said third friction-drum when in contact with either of the first two drums, to the axle of the truck-wheels, all constructed and adapted to operate substantially as and for the purpose set forth.

2. The combination, with a gas-engine suitably mounted upon a truck, of the friction-drums J and J', the gearing whereby said drums are rotated in opposite directions, the friction-drum J², journaled in the vibrating arm L, with devices, substantially as shown, for moving said arm so as to bring the drum J² into and out of contact with the drums and retaining the same in the different adjustments, the gear K², also journaled in said arm, and the gear K³, coacting with gear K⁴ on the axle of the truck, substantially as and for the purpose specified.

In testimony whereof I have hereunto affixed my signature this 3d day of July, A. D. 1885.

WILLIAM C. CARRICK.

Witnesses:
JOHN NOLAN,
ANDREW ZANE, Jr.